(12) United States Patent
Buhadi

(10) Patent No.: US 8,825,492 B1
(45) Date of Patent: Sep. 2, 2014

(54) LANGUAGE-BASED VIDEO GAME

(71) Applicant: Yousef A. E. S. M. Buhadi, Qurain (KW)

(72) Inventor: Yousef A. E. S. M. Buhadi, Qurain (KW)

( * ) Notice: Subject to any disclaimer, the term of this patent is extended or adjusted under 35 U.S.C. 154(b) by 0 days.

(21) Appl. No.: 14/065,157

(22) Filed: Oct. 28, 2013

(51) Int. Cl.
*G10L 21/00* (2013.01)
*G09B 19/04* (2006.01)

(52) U.S. Cl.
CPC .................................... *G09B 19/04* (2013.01)
USPC ................... 704/272; 704/275; 704/4; 704/9; 704/251; 463/9; 463/36; 463/32; 715/703; 715/733; 715/757; 715/758; 715/799; 434/156; 434/157; 434/167; 434/169; 434/176; 434/178; 434/185; 434/365

(58) Field of Classification Search
CPC ........... G06B 19/04; G06B 3/16; A63F 13/00
USPC .......................................................... 704/276
See application file for complete search history.

(56) References Cited

U.S. PATENT DOCUMENTS

| | | | | |
|---|---|---|---|---|
| 4,176,974 A * | 12/1979 | Bishai et al. | ................... | 400/111 |
| 4,507,734 A * | 3/1985 | Kaldas | ........................... | 715/256 |
| 4,604,712 A * | 8/1986 | Orrhammar | ................. | 358/1.11 |
| 4,710,877 A * | 12/1987 | Ahmed | .............................. | 704/1 |
| 4,734,036 A * | 3/1988 | Kasha | ............................ | 434/157 |
| 5,393,062 A * | 2/1995 | Cember | ..................... | 273/153 R |
| 6,256,650 B1 * | 7/2001 | Cedar et al. | .................... | 715/235 |
| 6,821,204 B2 * | 11/2004 | Aonuma et al. | ................ | 463/32 |
| 6,863,275 B2 * | 3/2005 | Chiu et al. | .................... | 273/302 |
| 7,342,587 B2 * | 3/2008 | Danzig et al. | ................. | 345/473 |
| 7,367,885 B2 * | 5/2008 | Escalera et al. | ................. | 463/32 |
| 7,401,018 B2 * | 7/2008 | Yamada et al. | ............... | 704/251 |
| 7,724,957 B2 * | 5/2010 | Abdulkader | ................. | 382/186 |
| 7,924,285 B2 * | 4/2011 | Brown et al. | ................. | 345/473 |
| 8,142,195 B2 * | 3/2012 | Guo | ............................. | 434/169 |
| 8,473,852 B2 * | 6/2013 | Russell | ......................... | 715/757 |
| 8,512,137 B2 * | 8/2013 | Hayes et al. | ..................... | 463/31 |
| 8,567,787 B1 * | 10/2013 | Chang | .......................... | 273/299 |
| 8,597,031 B2 * | 12/2013 | Cohen et al. | .................. | 434/323 |
| 2002/0103023 A1 * | 8/2002 | Matsuura et al. | ............... | 463/31 |
| 2004/0043805 A1 * | 3/2004 | Sonoda | ............................. | 463/1 |
| 2004/0091848 A1 * | 5/2004 | Nemitz | ......................... | 434/365 |
| 2004/0142738 A1 * | 7/2004 | Anderson et al. | ............... | 463/16 |
| 2004/0157655 A1 * | 8/2004 | Tsugiiwa | .......................... | 463/9 |
| 2005/0260547 A1 * | 11/2005 | Moody | ......................... | 434/176 |
| 2005/0261044 A1 * | 11/2005 | Persidsky | .......................... | 463/9 |
| 2006/0141425 A1 * | 6/2006 | De Ley et al. | ................ | 434/169 |
| 2007/0124675 A1 * | 5/2007 | Ban et al. | ...................... | 715/703 |

(Continued)

*Primary Examiner* — Pierre-Louis Desir
*Assistant Examiner* — Fariba Sirjani
(74) *Attorney, Agent, or Firm* — Richard C Litman

(57) ABSTRACT

The language-based video game places a player avatar into a game environment contained within a display field following a story narrative or an adventure for completing an objective. The gameplay reinforces pronunciation and writing of a given language. The display field includes a minor head graphic, as can be highlighted text in the given language, interactive text objects, and can include a control icon and a progress icon. The minor head graphic is a representation of a human head, or portion thereof, animated to show pronunciation of the highlighted text. As the player progresses through the game, the player encounters the interactive text objects that, upon activation, transform into useful objects for overcoming challenges present in the game environment, the interactive text object being the same as, substantially the same as, or corresponding to the highlighted text. Avatar movement and interactions are controlled through a control scheme via an interface.

20 Claims, 6 Drawing Sheets

(56) References Cited

U.S. PATENT DOCUMENTS

| | | | |
|---|---|---|---|
| 2007/0218432 A1* | 9/2007 | Glass et al. | 434/156 |
| 2007/0218987 A1* | 9/2007 | Van Luchene et al. | 463/30 |
| 2008/0166690 A1* | 7/2008 | Joiner | 434/167 |
| 2008/0254438 A1* | 10/2008 | Woolf et al. | 434/365 |
| 2009/0007468 A1* | 1/2009 | Smith | 40/124.01 |
| 2009/0170581 A1* | 7/2009 | Onuki et al. | 463/9 |
| 2009/0217196 A1* | 8/2009 | Neff et al. | 715/799 |
| 2010/0092933 A1* | 4/2010 | Kuchera et al. | 434/185 |
| 2010/0144444 A1* | 6/2010 | Graham | 463/42 |
| 2010/0182325 A1* | 7/2010 | Cederwall et al. | 345/473 |
| 2010/0261526 A1* | 10/2010 | Anderson et al. | 463/31 |
| 2010/0304862 A1* | 12/2010 | Coleman et al. | 463/32 |
| 2011/0049807 A1* | 3/2011 | Benty et al. | 273/299 |
| 2012/0092340 A1* | 4/2012 | Sarnoff et al. | 345/420 |
| 2012/0110479 A1* | 5/2012 | Fujisawa et al. | 715/758 |
| 2012/0282578 A1* | 11/2012 | Chapman et al. | 434/178 |
| 2013/0029299 A1* | 1/2013 | Layman | 434/157 |
| 2013/0185642 A1* | 7/2013 | Gammons | 715/733 |
| 2013/0260346 A1* | 10/2013 | Wood et al. | 434/156 |
| 2013/0260886 A1* | 10/2013 | Smith | 463/36 |

\* cited by examiner

LANGUAGE-BASED VIDEO GAME

BACKGROUND OF THE INVENTION

1. Field of the Invention

The present invention relates to language education, and particularly to a language-based video game promoting grammar, pronunciation, and contextual understanding of various languages in an interactive and entertaining manner.

2. Description of the Related Art

Language is one of the fundamental forms of communication. It is a means of conveying thought, ideas, culture, history and emotions. While many different languages have similarities to each other, each language also exhibits its own nuances, meanings and expressions, both in spoken and written forms. Languages have existed for centuries, but, over time, languages can evolve to a certain degree. However, some languages have remained relatively unchanged. While generations can strive to preserve the integrity of their languages, the current globalization of many aspects of life can slowly erode or affect the purity, e.g., the pronunciation or written form of the language, such as due to outside or foreign influences, as typically can occur or can be prevalent with the younger generation.

It typically can be a desire for individuals of an older generation to pass on and preserve their culture through a younger generation, especially through their spoken and written language. As a result, older generations having such desire for preserving their language, can expend efforts towards this goal, such as by speaking the language frequently, enrolling the younger generation in a language school, residing in cultural enclaves within a region, and generally maximizing exposure of the younger generation to the language. Even though the younger generation can be immersed in this type of language immersion environment, outside influences, such as the local popular culture, can still pervade or can result in incorrect pronunciations, slang, word or character forms, and introductions of terms not native to the spoken or written language. Therefore, a means of capturing and retaining an individual's attention to the spoken or written language can increase the effectiveness of language material being presented in teaching or reinforcing a pronunciation or expression of the language. Thus, a language-based video game addressing the aforementioned problems is desired.

SUMMARY OF THE INVENTION

The language-based video game places a player avatar into a game environment contained within a display field following a story narrative or an adventure for completing an objective. The gameplay reinforces pronunciation and writing of a given language. The display field includes a head graphic, text in the given language, interactive text objects, and can include a control icon and a progress icon. The head graphic shows a representation of at least a portion of the human head related to speech that is animated, such as to show relatively proper placement of the tongue and movement of the mouth and the throat for a proper or acceptable pronunciation of the text, and the text can be highlighted. As the player progresses through the game, the player encounters interactive text objects that, upon activation, transform into useful objects for overcoming challenges present in the game environment, the interactive text objects can be the same as, substantially the same as or can correspond to the text. Avatar movement and interactions are controlled through a control scheme via an interface.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
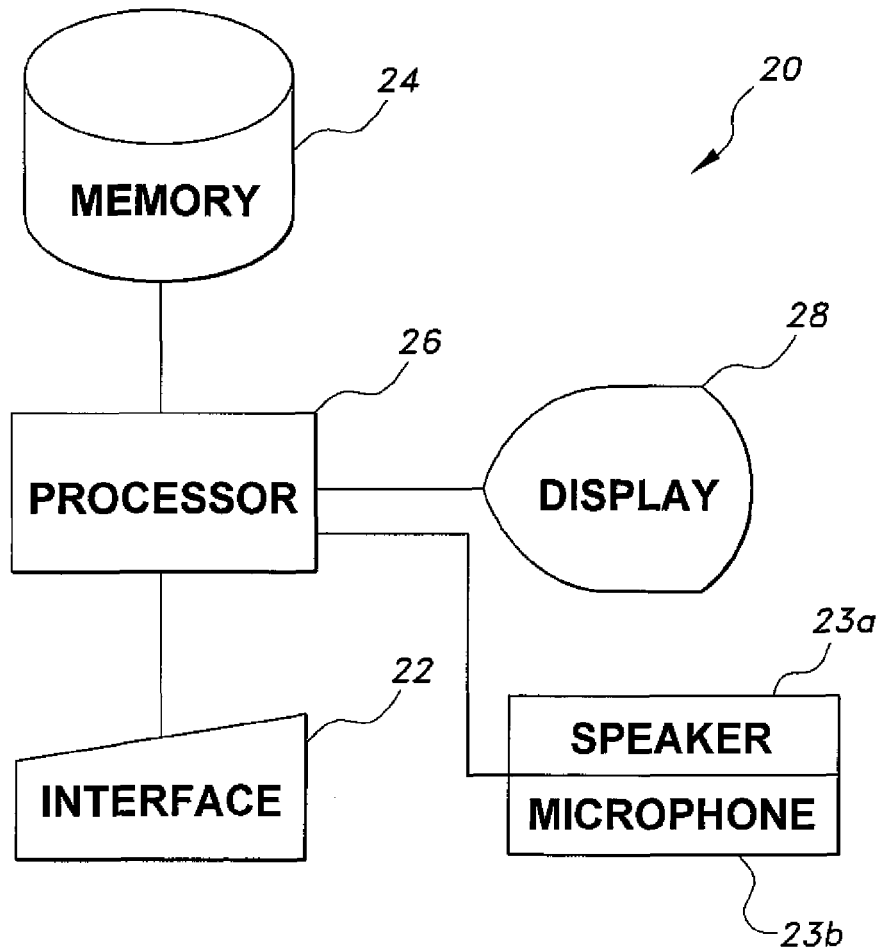
FIG. 1 is a block diagram of a generalized system for implementing embodiments of a language-based video game and methods for playing a language-based video game according to the present invention.

An embodiment of a language-based video game, generally referred to by the reference number 10 in the drawings, can provide an interactive and challenging experience that promotes learning of a language. Embodiments of a language-based video game, such as the language-based video game 10, include a program that can reside in a variety of non-transitory computer-readable media and installed in a variety of computer implemented devices, such as desktop computers, laptop computers, tablets, portable cellular phones, and the like. Also, the language based video game 10 can be a computer software product, the computer software product including a non-transitory storage medium readable by a processor of a computer implemented device, the non-transitory storage medium having stored thereon a set of instructions for simulating the language-based video game 10.

It should be understood that the calculations for and implementation of the gameplay of embodiments of the language-based video game, such as the language-based video game 10, e.g., graphics, level progression, presentation, avatar animation, onscreen objects and non-player character (NPC) animations, etc., can be performed by any suitable computer system, such as a generalized system 20 diagrammatically shown in FIG. 1. Data can be entered into or can be provided from the system 20 via any suitable type of user interface 22, and can be stored in memory 24, which can be any suitable type of computer readable and programmable memory and is desirably a non-transitory, computer readable storage medium.

A program or programs to carry out the steps or methods for playing the language-based video game 10 can also be stored in the memory 24. Calculations and implementation of the playing of the game, such as implementing a program or programs to carry out the steps or methods for playing the language-based video game 10 stored in the memory 24, are performed by and controlled by a processor 26, which can be any suitable type of computer implemented device, such as a computer processor, graphics processor, integrated computer and graphics processor, system on chip (SOC) processor and the like, and the gameplay and information can be displayed to the user or player of the language-based video game 10 on a display 28, which can be, for example, any suitable type of computer display or view screen. Examples of a user interface includes keyboards, computer mouse (an onscreen pointer device), touchscreens, touchpads, physiological recognition devices that track physical features such as eye movement, hand movement, and the like, gamepads, or game controllers. The system 20 can also include a speaker 23a to provide audio information to a player of the language-based video game 10 and a microphone 23b to receive vocal or speech input from the player.

The processor 26 can be associated with, or incorporated into, any suitable type of computing device, for example, a personal computer or a programmable logic controller. The display 28, the processor 26, the memory 24 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that can be used in addition to the memory 24, or in place of the memory 24, include a hard disk device (HDD), a solid-state drive (SSD), a flexible disk (FD), and a magnetic tape (MT). Examples of the optical disk include a BD (Blu-ray Disc), DVD (Digital Versatile Disc), a DVD-RAM, a CD-ROM (Compact Disc-Read Only Memory), and a CD-R (Recordable)/RW.

A purpose of embodiments of a language-based video game, such as the language-based video game 10, is to teach a user or player a proper or acceptable pronunciation of letters and words, such as through combinations of graphical representations of the human head, e.g., including mouth, teeth and tongue, the text of the letter or word, and/or sound of the letter or word. The language-based video game 10 facilitates such proper or acceptable pronunciation of letters and words by giving the player objectives to accomplish through various interactions within a virtual, game world, such as travel from point A to point B through a fantasy alphabet world. During the player's gameplay and/or interactions through such a virtual world, the language-based video game 10 provides opportunities where, for example, one or more letters of an alphabet or one or more words in a language are highlighted for study by and interaction with the player of the language-based video game 10, the details of which will be further described below. Exemplary rewards for completing the objective can range from numerical points to in-game accomplishments.

Referring now to FIGS. 2-4B, the processor 26 generates a display field 29 illustrated on the display 28, and a game environment within the display field 29 on the display 28, the processor 26 controlling the game environment to be changed on the display 28 at various points in the game's progression. The processor 26 generates and models at least one avatar 12, for at least one corresponding player, and at least one non-player character (NPC) 14 on the display field 29 on the display 28. In playing of the language-based video game 10, the processor 26 animates one or more interactions between the avatar 12 and the NPC 14, as well as various onscreen elements within the display field 29 on the display 28. To assist in playing the language-based video game 10, the processor 26 generates a control scheme, such as can include a control icon 40, and can generate a progress icon 46 to display in the display field 29 on the display 28, the control scheme to control movement and interaction of the avatar 12 during actual play.

Figure 2:
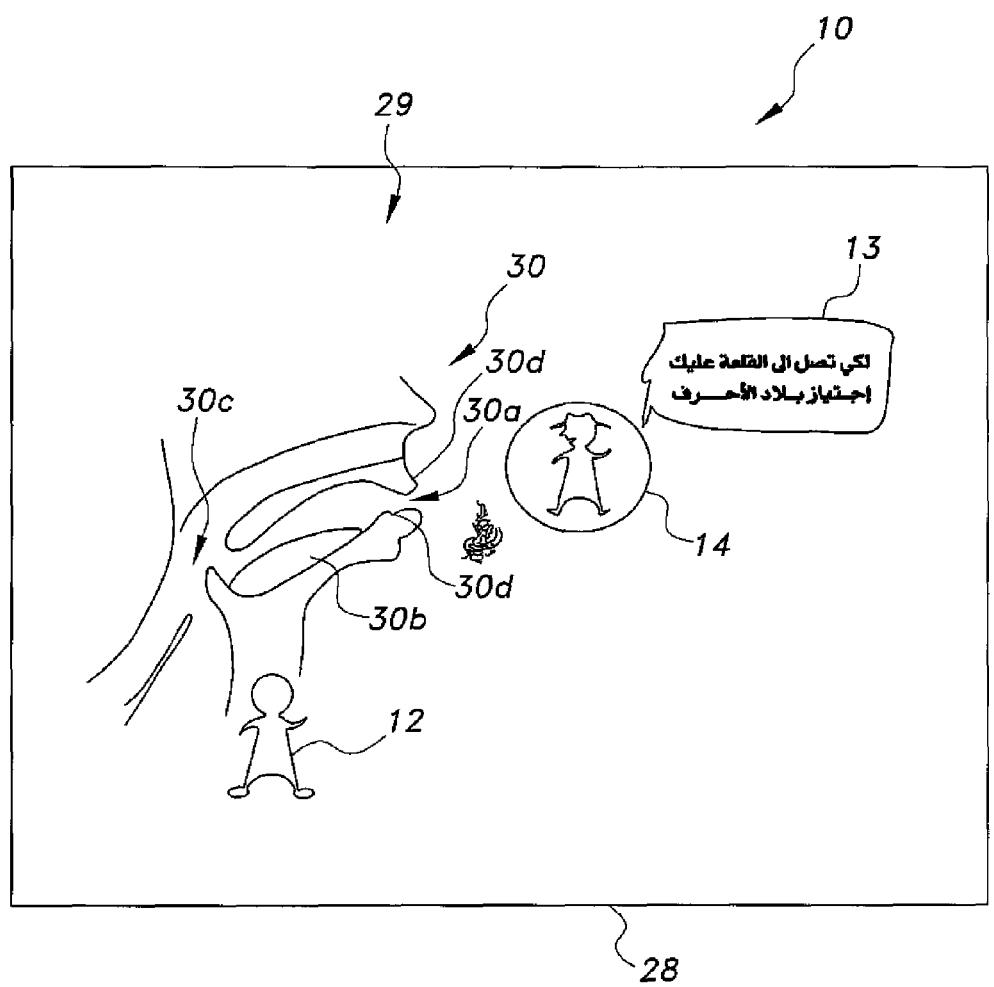
FIG. 2 is a schematic representation of an initial stage of an embodiment of a language-based video game according to the present invention.

FIG. 2 depicts an example of an initial or introductory stage of gameplay for the language-based video game 10. As illustrated in the display field 29 on the display 28, the language-based video game 10 places the user or player into a virtual world in which the player is represented as the avatar 12. For example, the avatar 12 can be a representation of a young person, a student or any humanoid or anthropomorphic individual. The avatar 12 typically can represent, in the language-based video game 10, a person who desires to better understand various fundamental nuances, grammar and/or pronunciation of a native language or a foreign language being studied or taught by the language-based video game 10.

In order to immerse the player and generate interest and attention, the language-based video game 10 can be based upon a story or literature told in a given language. In an embodiment of the language-based video game 10, the language being presented for study and educational entertainment is Arabic, for example. Arabic is an ancient language with a rich history and an artistic, flowing written form. Additionally, the Arabic culture is abundant in folklore, mythology and history from which many stories can be derived. As such, it is one of a number of languages well suited for graphical representation on a display 28. It should be recognized that Arabic is only one example of many different languages that the language-based video game 10 can present for study and educational entertainment, and the above use of Arabic should not be construed in a limiting sense.

In the exemplary introductory stage, the language-based video game 10 introduces the player, as the avatar 12, into a scenario where a player's language understanding is questioned by at least one non-player character (NPC) 14. The NPC 14 engages the player in the game environment in relation to at least one preliminary task in relation to accomplishing a corresponding objective of the language based video game 10. However, the language-based video game 10 can include a plurality of NPCs during the course of gameplay for selective interaction by the player's avatar 12, e.g. the additional NPCs can provide information about a stage of gameplay or provide additional objectives or tasks. For example, the NPC 14 can proceed to test the player's language competence by tasking the player to complete an objective or telling a story, for example. The objective or story can encompass a variety of topics and conveyed as a narrative, a poem, a phrase, a passage, an environment to explore, and the like.

The language-based video game 10 instructs the processor 26 to select at least one text in the given language to study using the language-based video game 10, and the processor 26 can display the at least one selected text in highlighted form within the display field 29 on the display 28. The text being highlighted or used in some manner within the game environment is desirably selected from a group of text that has been preselected and programmed into the language-based video game 10 within the given language.

Also, the language-based video game 10 can include a more interactive component wherein the player can select player-defined text from, e.g., a narrative 13 or by separate player input. The objective or story is reproduced as text on the display 28, such as indicated by the reference number 13 in FIG. 2. The language-based video game 10 can also include, for example, an audio component for the narrative, poem, phrase or passage, as well as accompanying music. In the case of the former, the spoken form provides another layer of training for the player via the phonetics of the language. The player as the avatar 12 then becomes the main character of the story to relive the adventures told thereby or is an adventurer out to conquer the given objective, for example.

Besides introduction of the story, narrative, or an objective, the introductory stage can also serve as a vehicle to familiarize the player with the rules and mechanics of the game. For example, as shown in FIG. 2, the display field 29 on the display 28 can also include a head graphic representation, hereinafter referred to as a "head graphic," showing a representation of at least a portion of a human head related to speech. The processor 26 can generate a main head graphic 30 showing a representation of at least a portion of a human head related to speech. The main head graphic 30 can be a substantially anatomical representation or other suitable representation of a human head or at least a portion of a human head related to speech. The main head graphic 30 can be displayed in a cross section or other suitable form within the display field on the display 28. The main head graphic 30 can include one or more of a representation of a mouth 30a, a tongue 30b, a throat 30c, and/or teeth 30d, for example. The main head graphic 30 is displayed within the display field 29 and animates in the introductory stage whenever text from the narrative 13 is used or activated. In the exemplary introductory stage shown in FIG. 2, one or more terms or text within the narrative 13 is highlighted.

In response to a highlighted text, the main head graphic 30 also animates, such as to illustrate a proper placement of the mouth 30a, the tongue 30b, the throat 30c and/or the teeth 30d for reproducing proper or acceptable pronunciation of the highlighted terms or text. This representation intuitively introduces the player to the concept of visual reinforcement, via the head graphic and similar game elements, for pronouncing words, letters, numbers, phrases, etc., in the language being employed or studied in the game. In most instances, the introductory stage generally does not require actual interaction from the player with highlighted text. However, the language-based video game 10 can include or prompt interaction from the player in order to at least familiarize the player with the above mechanics of the language-based video game 10.

After the introductory stage, the player's avatar 12 is placed in a game environment in which the player must progress through one or more stages of the language-based video game 10. In this exemplary embodiment, the game environment reflects the story being told or the various terrain of the virtual world that the player's avatar 12 must travel. The processor 26 can provide a narrative or objective for the at least one avatar 12 to experience or accomplish, for example.

At certain points in the progression of the game, one or more text 16, 17 in the given language, which can include alphabet letters, words, phrases, symbols, numbers, punctuation, passages or other text 16, 17 are highlighted and used in various ways in the game environment to overcome challenges or meet or accomplish one or more objectives. The highlighting can be facilitated by a font color distinguishable from the rest of the environment, animation—e.g., blinking text, sequence of changing font sizes, moving text, and the like, a combination of both, or any other electronic display of the text.

For the main gameplay, the display field 29 includes various elements that assist the player in playing the game. As best shown in FIGS. 3A-4B, the display field 29 includes a minor head graphic 32, the control icon 40 and the progress icon 46, for example. Similar to the main head graphic 30, the minor head graphic 32 can be a substantially anatomical representation or other suitable representation of a human head or at least a portion of a human head related to speech. The minor head graphic 32 can be displayed in a cross section or other suitable form within the display field on the display 28. The processor 26 generates the minor head graphic 32 that can be the same or substantially the same as the main head graphic 30 in function, except typically smaller in scale or at least a size unobtrusive to the rest of the display field 29. In other words, the size of the minor head graphic 32 should be large enough to convey the animation for pronunciation without undue eyestrain from the player and does not occupy so much screen space that inadvertently obscures viewing the details of the game environment. In this exemplary embodiment, the minor head graphic 32 is placed near the upper right-hand corner in the display field 29 on the display 28. However, the minor head graphic 32 can be placed at any desired location where it can be easily viewed by the player of the language-based video game 10 on the display 28.

The control of the avatar 12 is facilitated by the interface 22 in communication with the processor 26, as mentioned above. The display field 29 can also include a graphic representation in the form of the control icon 40 for controlling the avatar 12, the interface 22 assisting in operating the control icon 40. In an embodiment, the control scheme can include direction arrows 42 and a general interactive command button 44, such as can be included in conjunction with the control icon 40. When using an indirect-type interface 22 to operate the control icon 40, such as a keyboard, computer mouse and/or a game controller, each direction arrow 42 can highlight in response to whichever direction the user, such as a player of the game, specifies on or using the remote interface.

The interactive command button 44 functions in a similar manner for those instances where the language-based video game 10 requires an interactive response from the player, which the player facilitates by pressing a corresponding button, e.g., "ENTER" on a keyboard. In the case of a more direct interface, such as a touchscreen, the user can simply tap on select direction arrows 42 to move the avatar 12 and the interactive command button 44 to interact to provide an interactive response, for example. Thus, highlighting of select buttons on the control scheme by a suitable means through the interface 22, such as engaging a touchscreen displaying the select buttons or clicking on the select buttons, provides an immediate visual response to user or player input. The highlighting of the direction arrows 42 and the general interactive command button 44 can be facilitated by change in color, change in size, animations, combination of the above, and the like.

The above described processes of the control icon 40 relate to controlling the movement and interaction of the avatar 12. Additionally, the control icon 40 can also be used to navigate various onscreen menus or commands, such as those for setting gaming parameters, e.g., video and sound, or other options such as saving user selected gaming sessions or navigation to other features of the language-based video game 10.

The progress icon 46 can be a graphic representation for various data informing the player of various aspects of progression. For example, the progress icon 46 can be a gauge that graphically represents the player's life or lives left to continue play of the game or can represent progress through various stages or levels of the game, such as by indicating a completion percentage. Further, the progress icon 46 can also display different information such as the stage, the level number and/or name, statistical data, points or items earned, scores representing how well the player accomplished the objectives, and the like.

Desirably, the minor head graphic 32, the control icon 40 and the progress icon 46 can remain onscreen throughout most of the gameplay so that the visual information therefrom is always available to the player. However, certain instances of the game do not generally require the above elements, such as a cutscene or some other interruption to normal play.

Figure 3A:
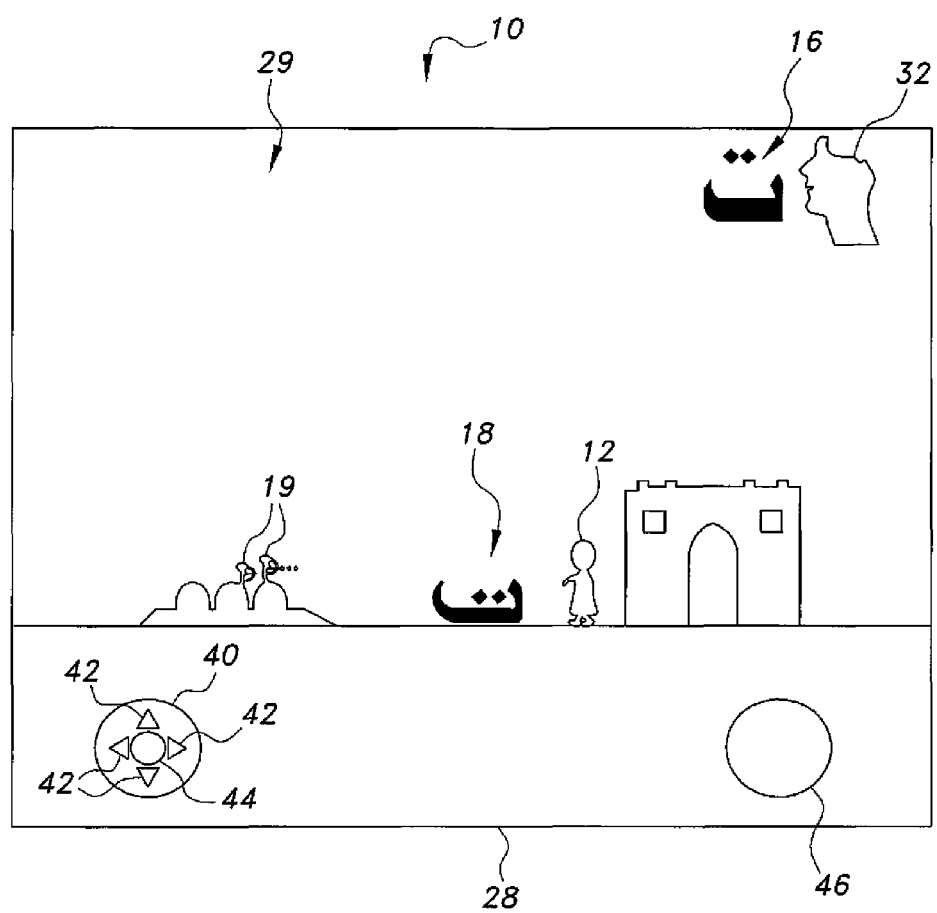
FIG. 3A is a schematic representation of an intermediate stage of an embodiment of a language-based video game according to the present invention with a highlighted text in a non-interactive state.
Figure 3B:
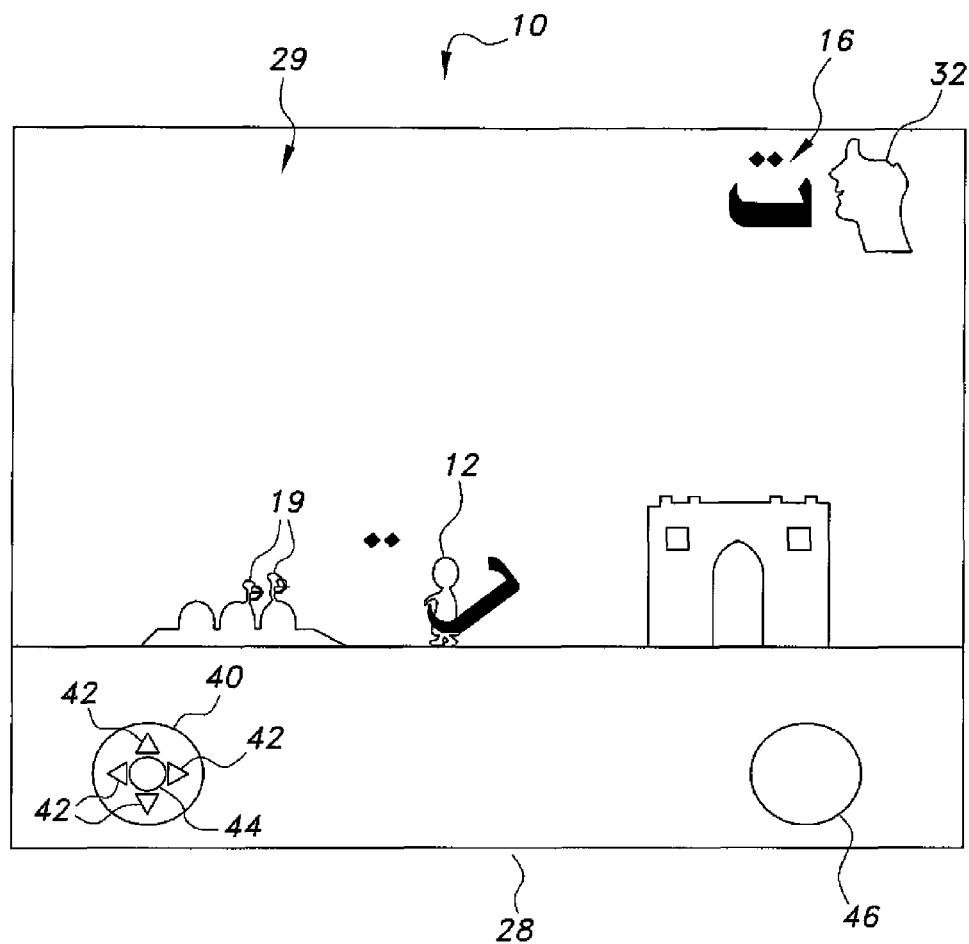
FIG. 3B is a schematic representation of the intermediate stage of the language-based video game shown in FIG. 3A with the highlighted text in a transformative, interactive state.

An example of one of various gameplay stages after the exemplary introductory stage is depicted in FIGS. 3A and 3B. In the stage of FIGS. 3A and 3B, the player's avatar 12 is confronted with a pair of enemies 19. The language-based video game 10, via the processor 26, generates a highlighted text 16 to be displayed adjacent the minor head graphic 32 for entertainment and/or study. The highlighted text 16 in this example is an Arabic alphabet correlating to the sound "T" in the English alphabet and shown in the upper right hand corner of the display 28. This highlighted text, such as the text 16, can also be displayed within the game environment, indicated by the text object 18 shown in FIG. 3A.

Desirably, the highlighted text 16 and the text object 18 are identical, substantially identical or correspond in terms of the alphabet, word, number, passage, etc. they represent within a given segment or stage of the gameplay in a game progression. This visually builds a correlation for the player with respect to the game generated selected text, i.e. the highlighted text, presented for entertainment and/or study and the corresponding interaction therewith, i.e. the text object. Stylistic differences between the highlighted text 16 and the text object 18 can exist as long as they are same, substantially the same or correspond to an alphabet, a word, passage, a number, etc. The player is prompted to interact with the highlighted text object 18 in the game environment in various ways, such as with a pointer, touch-pen, finger, a manual activation of a button, such as upon the avatar 12 reaching, walking to or through the text object 18, etc., which will transform the text object 18 into a weapon, tool, or other object that can assist the player's avatar 12 in overcoming the challenge or accomplishing an objective.

The highlighting of the text object 18 can be facilitated in a similar manner to the highlighted text 16. In the example of FIGS. 3A and 3B, the text object 18 activates when the avatar 12 walks over the text object 18 transforming the same into a catapult that flings the "dots" towards the enemies 19 as best shown in FIG. 3B. When the highlighted text 16 is displayed, the minor head graphic 32 animates to graphically show the proper pronunciation. Also, the minor head graphic 32 can animate as the player's avatar 12 interacts with the text object 18.

Figure 4A:
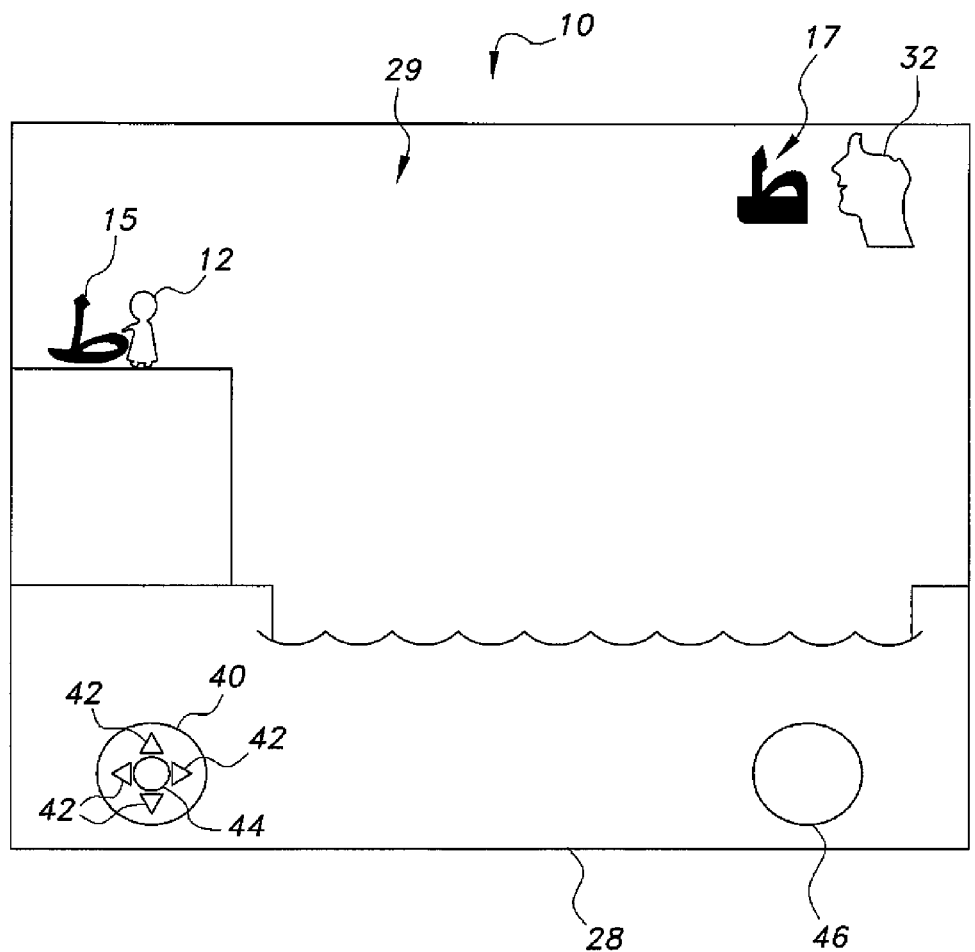
FIG. 4A is a schematic representation of another intermediate stage of an embodiment of a language based video game according to the present invention with another highlighted text in a non-interactive state.
Figure 4B:
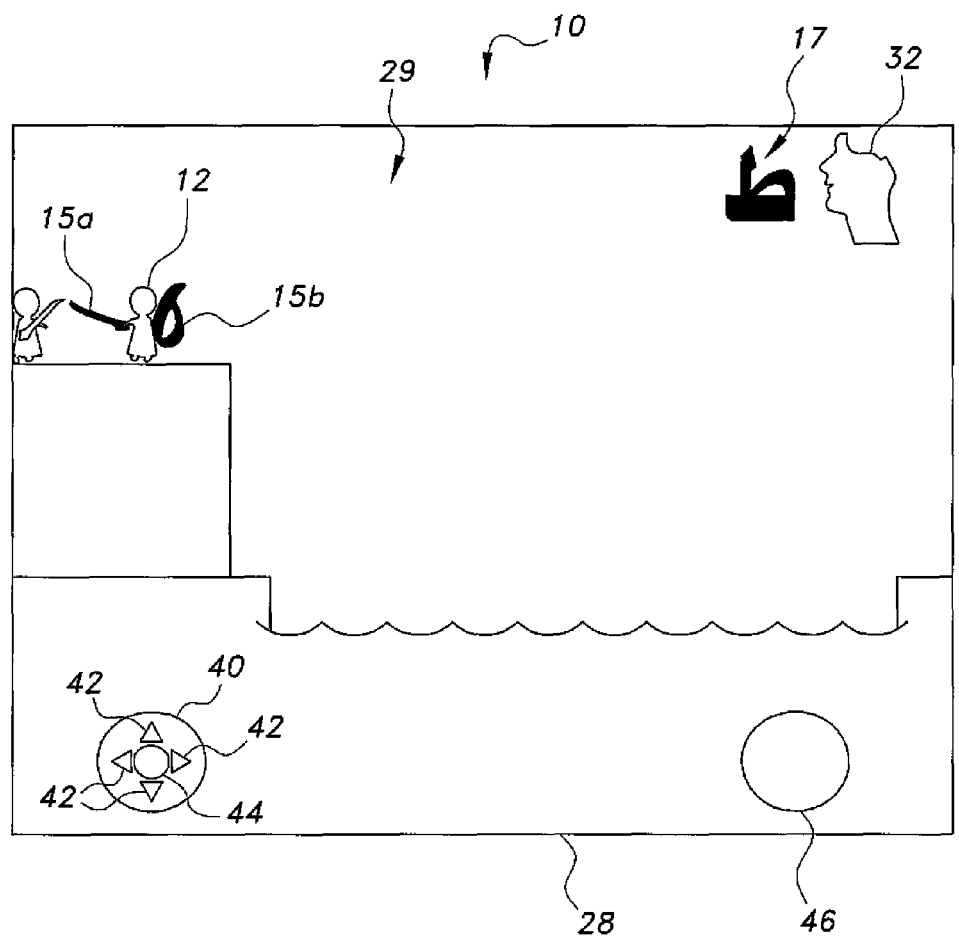
FIG. 4B is a schematic representation of the another intermediate stage of the language-based video game shown in FIG. 4A with the another highlighted text in a transformative, interactive state.

In the exemplary gameplay stage shown in FIGS. 4A and 4B, the avatar 12 has traveled across an expanse of water to attack a castle. Another highlighted text 17 is displayed for entertainment and/or study at this stage. In the example of FIGS. 4A and 4B, the highlighted text 17 is an Arabic alphabet correlating to the sound "Ta" in the English language. A corresponding interactive text object 15 is also placed in the game environment for player interaction. The processor 26 can transform the interactive text object, such as the interactive text object 15, into a form usable by the avatar 12 to overcome at least one challenge within the game environment and animates the transformation and use of the transformed text object, for example, to accomplish or achieve an objective or overcome a challenge in playing of the language-based video game 10. The corresponding interactive text object 15 has been transformed into a stylized sword 15a and a shield 15b as shown in FIG. 4B when the avatar 12 interacts with the interactive text object 15. In addition to such interactive text elements and various transformations, other non-textual interactive objects can also be present within the game world, such as a rope, a paddle, a plate, etc. that contribute to the adventure, and such interactive objects should not be construed in a limiting sense.

During the course of gameplay in the game progression, the player, via the avatar 12, typically is exposed to various different stages or sub-stages, such as similar to the examples shown in FIGS. 3A-4B. The environment and the context can change but at each stage or sub-stage, the player is typically presented with a highlighted text and a corresponding text object for interaction. The highlighted text normally displays adjacent the minor head graphic 32, so that the animation thereof can be matched with or can correspond to the highlighted text. The combination of the animation with the highlighted text can reinforce both speech and writing for the player of the game.

The above described steps in the language-based video game 10, such as illustrated in FIGS. 2-4B, can be repeated one or more times, by the processor 26 selecting another one or more texts in the given language to study in the interactive portion of the language-based video game 10, such as to complete the objective or challenge, or to study additional text in the language, for example. For each one or more times the language-based video game 10 is played with the one or more selected additional texts, the selected additional text in highlighted form is displayed within the display field 29, the minor head graphic 32 is animated in response to the selected additional text in order to graphically show a correct, or an acceptable, pronunciation of the additional selected text, and an interactive text object, corresponding to the additional selected text, is displayed in highlighted form within the game environment within the display field 29.

Further, the avatar 12 is controlled by the player to interact with the interactive text object to overcome a challenge or to achieve or accomplish an objective, and the interactive text object is transformed into a form usable by the avatar 12, such as the stylized sword 15a and the shield 15b, and the avatar 12 and transformed text object can be animated and can be used to accomplish or achieve an objective or to overcome a challenge within the game environment, as described. The processor 26 can enable displaying the another at least one selected text in highlighted form adjacent the minor head graphic 32 within the display field 29 on the display 28. The minor head graphic 32 is animated in response to the another at least one selected text in order to graphically show correct, or acceptable, pronunciation of the another at least one selected text.

Also, an interactive text object corresponding to the selected another text is displayed in highlighted form within the game environment within the display field 29 on the display 28. Similarly, such as shown in the FIGS. 3A-4B, the highlighted selected another text is displayed adjacent the minor head graphic 32, so that the animation thereof can be matched with or can correspond to the specified text. The avatar 12 is controlled by the player to interact with the interactive text object to overcome a challenge or to achieve or accomplish an objective, for example. In the interactive portion of the language-based video game 10, the interactive text object is similarly transformed into a form usable by the avatar 12. The avatar 12 and transformation or transformed text object can be animated and can be used to accomplish or achieve an objective or to overcome a challenge within the game environment.

Also, in playing the language-based video game 10, the processor 26 can provide an audio recitation, such as through the speaker 23a, or can receive a player's verbal input, such as through the microphone 23b, for or in relation to a narrative, an objective, a selected text, another selected text, an interactive text, etc., to assist a player to better understand and speak various fundamental nuances, grammar and/or pronunciation of a language being studied or taught by the language-based video game 10, for example.

By playing of the language-based video game 10 using the above described elements, the language-based video game 10 can reinforce correct or acceptable pronunciation and meaning of select terms, words, phrases, letters or numbers of the language being used or taught by the language-based video game 10. The language-based video game 10 can also train the player to recognize the correct text, and the story or objective employed in the language-based video game 10 can provide a catalyst to assist in enabling an understanding of the context of the words, phrases, terms, numbers or letters used. Also, since the language-based video game 10 is a video game, the game format can enhance the appeal to a wider range of users, such as a younger generation.

It is to be understood that the present invention is not limited to the embodiments described above, but encompasses any and all embodiments within the scope of the following claims.

I claim:

1. A method for playing an educational language-based video game providing a graphical user interface in accordance with instructions executed by at least one processor, the instructions being stored in a memory, the processor providing images for display and changing the images in response to player input, comprising the steps of:

first, generating a display field and a game environment within the display field, the game environment respectively corresponding to a corresponding stage of one or more stages in a game progression;

second, generating at least one avatar, the at least one avatar representing at least one corresponding player of the language-based video game;

third, generating a control scheme to control avatar movement and interaction of the avatar in a corresponding stage in the game progression;

fourth, selectively generating at least one head graphic showing a representation of at least a portion of a human head related to speech;

fifth, selectively displaying the game environment, at least one head graphic, and at least one avatar within the display field;

sixth, providing an objective for the at least one avatar to accomplish;

seventh, using the processor, selecting at least one text in a given language in relation to accomplishing the provided objective, wherein the selected at least one text includes predetermined component parts;

eighth, displaying the at least one selected text within the display field;

ninth, animating the at least one head graphic in response to the at least one selected text in order to graphically show a pronunciation of the at least one selected text;

tenth, displaying an interactive text object within an avatar-occupied game environment within the display field, the interactive text object corresponding to the at least one selected text;

eleventh, controlling the avatar to interact with the interactive text object;

twelfth, transforming the interactive text object into a non-textual form, wherein the component parts have been rearranged to be usable by the avatar to overcome at least one challenge to accomplish the provided objective within the game environment;

thirteenth, selectively using the transformation of the interactive text object to overcome the at least one challenge; and fourteenth, providing an audio recitation for at least one or more of said objective, the selected text, the corresponding selected text, the interactive text object or the corresponding interactive text object;

fifteenth, repeating the eighth through thirteenth steps in the game progression until completion of the provided objective, wherein at least one stage in the game progression relating to accomplishing the provided objective has a corresponding selected text and a corresponding interactive text object for interaction with the avatar at a corresponding stage in the game progression.

2. The method for playing an educational language-based video game according to claim 1, wherein said control scheme comprises direction arrows and a general interactive command button.

3. The method for playing an educational language-based video game according to claim 2, further comprising the step of:

providing an interface for operating said control scheme.

4. The method for playing an educational language-based video game according to claim 3, further comprising the step of:

highlighting one or more of said direction arrows and said general interactive command button when respectively selected in response to input from the player through said interface.

5. The method for playing an educational language-based video game according to claim 4, wherein said step of highlighting comprises the step of selecting from a group consisting of changing color, changing size, animating the selected one or more of direction arrows and the selected general interactive command button, and combinations thereof.

6. The method for playing an educational language-based video game according to claim 1, wherein the at least one selected text or the corresponding selected text is selectively displayed in highlighted form within the display field, and the interactive text object or the corresponding interactive text object corresponding to the at least one selected text or to the corresponding selected text is selectively displayed in highlighted form within the avatar-occupied game environment within the display field.

7. The method for playing an educational language-based video game according to claim 6, wherein selectively displaying the at least one selected text, the corresponding selected text, the interactive text object and the corresponding interactive text object in highlighted form comprises the step of selecting from a group consisting of changing a color of said at least one selected text, said corresponding selected text, said interactive text object or said corresponding interactive text object, changing a font size of said at least one selected text, said corresponding selected text, said interactive text object or said corresponding interactive text object, animating said at least one selected text, said corresponding selected text, said interactive text object or said corresponding interactive text object, and combinations thereof.

8. The method for playing an educational language-based video game according to claim 1, further comprising the step of:

selectively generating at least one non-player character (NPC) during at least an introductory stage in the game progression, the at least one NPC selectively providing at least one player with information or at least one task in relation to accomplishing a corresponding objective.

9. The method for playing an educational language-based video game according to claim 1, wherein said step of selectively generating at least one head graphic comprises the step of generating a main head graphic in an introductory stage in the game progression and a minor head graphic in a remaining stage in the game progression, the minor head graphic being smaller in scale with respect to the main head graphic.

10. The method for playing an educational language-based video game according to claim 1, wherein the interactive text transformation into at least one other usable object is selected from the steps consisting of: separating, reshaping, restructuring, reformatting, and/or re-rendering the interactive text; and wherein the at least one challenge is selected from the group consisting of: battle, confrontation, contest, race, match, and/or competition.

11. A computer software product, comprising a non-transitory storage medium readable by a processor of a computer implemented device, the non-transitory storage medium having stored thereon a set of instructions for simulating a language-based video game, the set of instructions comprising:

a first sequence of instructions which, when executed by the processor, causes said processor to generate a display field and a game environment within the display field, the game environment respectively corresponding to a corresponding stage of one or more stages in a game progression;

a second sequence of instructions which, when executed by the processor, causes said processor to generate at least one avatar, the at least one avatar representing at least one corresponding player of the language-based video game;

a third sequence of instructions which, when executed by the processor, causes said processor to generate a control scheme to control avatar movement and interaction of the avatar in a corresponding stage in the game progression;

a fourth sequence of instructions which, when executed by the processor, causes said processor to selectively generate at least one head graphic showing a representation of at least a portion of a human head related to speech;

a fifth sequence of instructions which, when executed by the processor, causes said processor to selectively display the game environment, at least one head graphic, and at least one avatar within the display field;

a sixth sequence of instructions which, when executed by the processor, causes said processor to provide an objective for the at least one avatar to accomplish;

a seventh sequence of instructions which, when executed by the processor, causes said processor to select at least one text in a given language in relation to accomplishing the provided objective, wherein the selected at least one text includes predetermined component parts;

an eighth sequence of instructions which, when executed by the processor, causes said processor to display the at least one selected text within the display field;

a ninth sequence of instructions which, when executed by the processor, causes said processor to animate the at least one head graphic in response to the at least one selected text in order to graphically show a pronunciation of the at least one selected text;

a tenth sequence of instructions which, when executed by the processor, causes said processor to display an interactive text object within an avatar-occupied game environment within the display field, the interactive text object corresponding to the at least one selected text;

an eleventh sequence of instructions which, when executed by the processor, causes said processor to control the avatar to interact with the interactive text object;

a twelfth sequence of instructions which, when executed by the processor, causes said processor to transform the interactive text object into a non-textual form, wherein the component parts have been rearranged to be usable by the avatar to overcome at least one challenge to accomplish the provided objective within the game environment;

a thirteenth sequence of instructions which, when executed by the processor, causes said processor to selectively use the transformation of the interactive text object to overcome the at least one challenge; and a fourteenth sequence of instructions which, when executed by the processor, causes said processor to provide an audio recitation for at least one or more of said objective, said selected text, said corresponding selected text, said interactive text object or said corresponding interactive text object;

a fifteenth sequence of instructions which, when executed by the processor, causes said processor to repeat the seventh sequence of instructions through the fourteenth sequence of instructions in the game progression until completion of the provided objective, wherein the set of instructions, when executed by the processor, causes said processor to provide at least one stage in the game progression relating to accomplishing the provided objective to have a corresponding selected text and a corresponding interactive text object for interaction with the avatar at a corresponding stage in the game progression.

12. The computer software product according to claim 11, wherein to generate said control scheme comprises a sequence of instructions which, when executed by the processor, causes said processor to generate direction arrows and a general interactive command button.

13. The computer software product according to claim 12, the set of instructions further comprising:

a sixteenth sequence of instructions which, when executed by the processor, causes said processor to provide an interface for operating said control scheme.

14. The computer software product according to claim 13, the set of instructions further comprising:

a seventeenth sequence of instructions which, when executed by the processor, causes said processor to highlight one or more of said direction arrows and said general interactive command button when respectively selected in response to input from the player through said interface.

15. The computer software product according to claim 14, wherein to highlight one or more of said direction arrows and said general interactive command button comprises a sequence of instructions which, when executed by the processor, causes said processor to select from a group consisting of changing color, changing size, animating the selected one or more of direction arrows and the selected general interactive command button, and combinations thereof.

16. The computer software product according to claim 11, the set of instructions further comprising:

a sixteenth sequence of instructions which, when executed by the processor, causes said processor to:

selectively display in highlighted form within the display field the at least one selected text or the corresponding selected text; and selectively display in highlighted form within the avatar-occupied game environment within the display field the interactive text object or the corresponding interactive text object corresponding to the at least one selected text or to the corresponding selected text.

17. The computer software product according to claim 16, wherein to selectively display in highlighted form the at least one selected text, the corresponding selected text, the interactive text object and the corresponding interactive text object within the display field comprises a sequence of instructions which, when executed by the processor, causes said processor to select from a group consisting of changing a color of said at least one selected text, said corresponding selected text, said interactive text object or said corresponding interactive text object, changing a font size of said at least one selected text, said corresponding selected text, said interactive text object or said corresponding interactive text object, animating said at least one selected text, said corresponding selected text, said interactive text object or said corresponding interactive text object, and combinations thereof.

18. The computer software product according to claim 11, the set of instructions further comprising:
   a sixteenth sequence of instructions which, when executed by the processor, causes said processor to selectively generate at least one non-player character (NPC) during at least an introductory stage in the game progression, the at least one NPC selectively providing at least one player with information or at least one task in relation to accomplishing a corresponding objective.

19. The computer software product according to claim 11, wherein to selectively generate at least one head graphic comprises a sequence of instructions which, when executed by the processor, causes said processor to generate a main head graphic in an introductory stage in the game progression and a minor head graphic in a remaining stage in the game progression, the minor head graphic being smaller in scale with respect to the main head graphic.

20. The computer software product according to claim 11, wherein the interactive text transformation into at least one other usable object is selected from the steps consisting of: separating, reshaping, restructuring, reformatting, and/or re-rendering the interactive text; and
   wherein the at least one challenge is selected from the group consisting of: battle, confrontation, contest, race, match, and/or competition.

* * * * *